United States Patent [19]

Mallick et al.

[11] Patent Number: 5,913,054
[45] Date of Patent: Jun. 15, 1999

[54] METHOD AND SYSTEM FOR PROCESSING A MULTIPLE-REGISTER INSTRUCTION THAT PERMIT MULTIPLE DATA WORDS TO BE WRITTEN IN A SINGLE PROCESSOR CYCLE

[75] Inventors: Soummya Mallick; Rajesh Bhikubhai Patel, both of Austin; Albert John Loper, Cedar Park; Romesh Mangho Jessani, Austin, all of Tex.

[73] Assignees: International Business Machines Corporation, Armonk, N.Y.; Motorola, Inc., Schaumburg, Ill.

[21] Appl. No.: 08/768,059

[22] Filed: Dec. 16, 1996

[51] Int. Cl.$^6$ ................................ G06F 9/00; G06F 9/30
[52] U.S. Cl. .................. 395/561; 395/566; 395/567; 395/595; 395/800.23; 711/200; 711/201
[58] Field of Search ................ 395/800.04, 800.07, 395/800.08, 800.09, 800.23, 800.24, 561, 563, 566–567, 376, 380–383, 390–394, 595; 711/200–201

[56] References Cited

U.S. PATENT DOCUMENTS

| | | | |
|---|---|---|---|
| 4,814,496 | 3/1989 | Hansen et al. | 711/201 |
| 5,396,610 | 3/1995 | Yoshida et al. | 711/150 |
| 5,416,911 | 5/1995 | Dinkjian et al. | 395/566 |
| 5,465,373 | 11/1995 | Kahle et al. | 395/391 |
| 5,481,734 | 1/1996 | Yoshida | 395/566 |
| 5,557,768 | 9/1996 | Braceras et al. | 711/131 |
| 5,640,588 | 6/1997 | Vegesna et al. | 395/800.23 |
| 5,680,338 | 10/1997 | Agarwal et al. | 365/736.03 |
| 5,680,568 | 10/1997 | Sakamura | 711/220 |
| 5,694,565 | 12/1997 | Kahle et al. | 395/391 |
| 5,699,536 | 12/1997 | Hopkins et al. | 395/392 |

FOREIGN PATENT DOCUMENTS

| | | | |
|---|---|---|---|
| 473805A1 | 11/1992 | European Pat. Off. | G06F 9/30 |
| 735463A2 | 2/1996 | European Pat. Off. | G06F 9/38 |
| 9608767A2 | 3/1996 | WIPO | G06F 9/32 |

OTHER PUBLICATIONS

Online Search, 01518269 of Hewlett–Packard Journal, v43, n3, pp. 1–3, Jun. 1992, Kerschen et al, HP–UX operation system kernel support for the HP 9000 series 700 workstations.

*Primary Examiner*—Krisna Lim
*Assistant Examiner*—Bharat Barot
*Attorney, Agent, or Firm*—Casimer K. Salys; Brian F. Russell; Andrew J. Dillon

[57] ABSTRACT

A processor and method of processing a multiple-register instruction are described. The processor includes execution circuitry and a set of registers, which are each capable of storing a data word. A multiple-register instruction specifying a plurality of data words that are to be written to a corresponding plurality of registers within the set of registers is dispatched to the execution circuitry. In response to receipt of the multiple-register instruction, the execution circuitry executes the multiple-register instruction, such that at least two data words among the plurality of data words are written to at least two corresponding registers among the plurality of registers during a single cycle of the processor.

8 Claims, 5 Drawing Sheets

METHOD AND SYSTEM FOR PROCESSING A MULTIPLE-REGISTER INSTRUCTION THAT PERMIT MULTIPLE DATA WORDS TO BE WRITTEN IN A SINGLE PROCESSOR CYCLE

BACKGROUND

1. Technical Field

The technical field of the present specification relates in general to a method and system for data processing and in particular to a method and system for efficiently executing a multiple-register instruction. Still more particularly, the technical field of the present specification relates to a method and system for efficiently executing a multiple-register instruction, which permit multiple registers within a processor to be accessed within a single cycle.

2. Description of the Related Art

A typical state-of-the-art processor comprises multiple execution units, which are each optimized to execute a corresponding type of instruction. Thus, for example, a processor may contain a fixed-point unit (FXU), a floating-point unit (FPU), a branch processing unit (BPU), and a load-store unit (LSU) for executing fixed-point, floating-point, branch, and load and store instructions, respectively. In addition, the processor may include a number of architected register for temporarily storing instruction operands and result data, as well as on-board cache memory and an interface unit for interfacing the processor to a data processing system bus.

While processing data, it is frequently necessary to transfer large blocks of data between memory and the architected registers within a processor. For example, to perform mathematical operations on matrices, the values of the matrix elements must be loaded into the architected registers of the processor for subsequent use by the FPU or FXU. In order to simplify such transfers of large data blocks, some processors support load and store multiple instructions, which load data to and store data from multiple architected registers. Processors supporting load and store multiple instructions may also support string instructions that are utilized to transfer large blocks of data between multiple architected registers and unaligned memory addresses (i.e., memory addresses that are neither doubleword aligned nor word aligned).

While string instructions and load and store multiple instructions (all hereinafter referred to simply as multiple-register instructions) simplify the transfer of large blocks of data between memory and a processor's architected registers from a programming standpoint in that only a single instruction is required, multiple-register instructions often have a greater latency and take longer to execute than a sequence of individual load or store instructions that produce the same result. One reason for the inefficiency of the execution of multiple-register instructions in prior art processors is that such processors typically permit all load and store instructions, including multiple-register instructions, to access only a single architected register each cycle.

As should thus be apparent, an improved method and system are needed for executing multiple-register instructions with greater efficiency.

SUMMARY

It is therefore one object of the present disclosure to provide an improved method and system for data processing.

It is another object of the present disclosure to provide a method and system for efficiently executing a multiple-register instruction.

It is yet another object of the present disclosure to provide a method and system for efficiently executing a multiple-register instruction, which permit multiple registers within a processor to be accessed in a single cycle.

The foregoing objects are achieved as is now described. A processor and method of processing a multiple-register instruction are provided. The processor includes execution circuitry and a set of registers, which are each capable of storing a data word. A multiple-register instruction specifying a plurality of data words that are to be written to a corresponding plurality of registers within the set of registers is dispatched to the execution circuitry. In response to receipt of the multiple-register instruction, the execution circuitry executes the multiple-register instruction, such that at least two data words among the plurality of data words are written to at least two corresponding registers among the plurality of registers during a single cycle of the processor.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
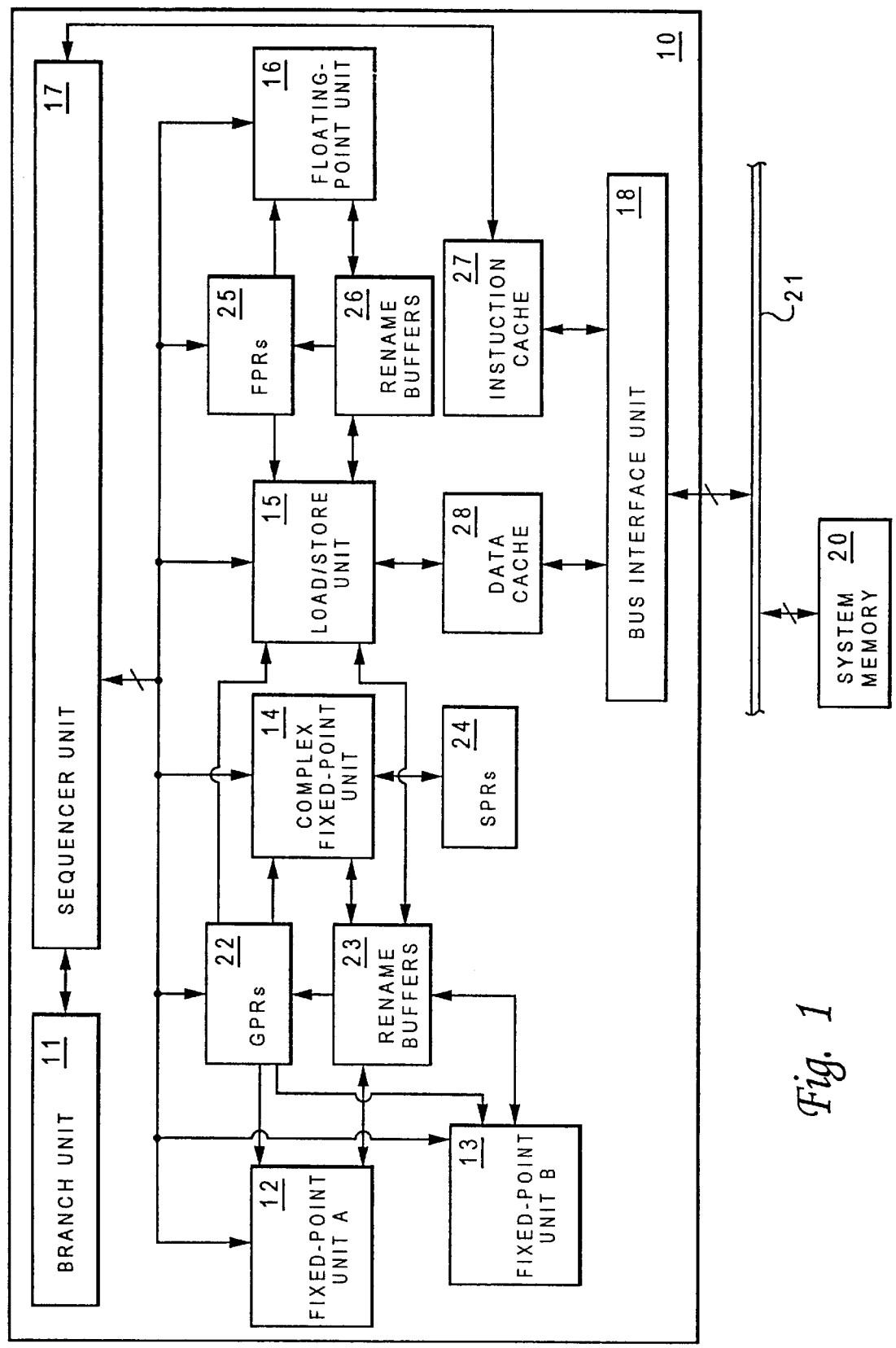
FIG. 1 is a block diagram depiction of a processor for processing information in accordance with an illustrative embodiment of the present invention.

With reference now to the figures and in particular with reference to FIG. 1, there is illustrated a block diagram depiction of an illustrative embodiment of a processor 10. In the illustrative embodiment, processor 10 is a single integrated circuit superscalar microprocessor. Accordingly, as discussed further hereinbelow, processor 10 includes various execution units, registers, buffers, memories, and other sections, all of which are formed by integrated circuitry. Also, processor 10 operates according to reduced instruction set computing (RISC) techniques. As depicted in FIG. 1, a system bus 21 is connected to a bus interface unit (BIU) 18 of processor 10. BIU 18 controls the transfer of data between processor 10 and system bus 21.

BIU 18 is connected to an instruction cache 27 and to a data cache 28. Instruction cache 27 outputs instructions to a sequencer unit 17. In response to the receipt of instructions from instruction cache 27, sequencer unit 17 selectively outputs instructions to the other execution circuitry of processor 10.

In addition to sequencer unit 17, the execution circuitry of processor 10 includes six execution units, namely a branch unit 11, a fixed-point unit A (FXUA) 12, a fixed-point unit B (FXUB) 13, a complex fixed-point unit (CFXU) 14, a load/store unit (LSU) 15, and a floating-point unit (FPU) 16. FXUA 12, FXUB 13, CFXU 14, and LSU 15 receive their source operands from general-purpose registers (GPRs) 22 and fixed-point rename buffers 23. Moreover, FXUA 12 and FXUB 13, CFXU 14, and LSU 15 output results (destination operands) of their operations for storage at selected entries in fixed-point rename buffers 23. Also, CFXU 14 inputs and outputs source operands and destination operands to and from special purpose registers (SPRS) 24. FPU 16 inputs its source operands from floating-point registers (FPRs) 25 and floating-point rename buffers 26. FPU 16 stores output results (destination operands) of its operation within selected entries in floating-point rename buffers 26.

In response to a load instruction, LSU 15 retrieves data from data cache 28 and copies such data to selected ones of fixed-point rename buffers 23 and floating-point rename buffers 26. If requested data is not resident within data cache 28, then data cache 28 retrieves (through BIU 18 and system bus 21) the requested data from system memory 20 connected to system bus 21. Moreover, data cache 28 is able to write data to system memory 20 via BIU 18 and system bus 21. In the illustrative embodiment, data cache 28 is capable of supplying a doubleword (8 bytes) of data per cycle to LSU 15. In response to a store instruction, LSU 15 copies data from a selected one of GPRs 22 and FPRs 25 to specified locations within data cache 28. As described in greater detail below, LSU 15 also supports multiple-register instructions that transfer blocks of data between data cache 28 (or system memory 20) and GPRs 22.

Sequencer unit 17 stores data to and retrieves data from GPRs 22 and FPRs 25. From sequencer unit 17, branch unit 11 receives branch instructions and signals indicating a present state of processor 10. In response to these branch instructions and signals, branch unit 11 outputs (to sequencer unit 17) signals indicating suitable memory addresses storing a sequence of instructions for execution by processor 10. In response to receipt of these signals from branch unit 11, sequencer unit 17 retrieves the indicated sequence of instructions from instruction cache 27. If one or more instructions within the sequence of instructions is not stored in instruction cache 27, then instruction cache 27 fetches (through BIU 18 and system bus 21) such instructions from system memory 20.

Sequencer unit 17 selectively dispatches instructions fetched from instruction cache 27 to selected ones of execution units 11, 12, 13, 14, 15, and 16. Each execution unit executes one or more instructions of a particular class of instructions. For example, FXUA 12 and FXUB 13 execute a first class of fixed-point mathematical operations on source operands, such as addition, subtraction, ANDing, ORing, and XORing. CFXU 14 executes a second class of fixed-point operations on source operands, such as fixed-point multiplication and division. FPU 16 executes floating-point operations on source operands, such as floating-point multiplication and division.

As data is stored within a selected one of fixed-point rename buffers 23, the data is associated with a storage location (e.g., one of GPRs 22) specified by the instruction to which the selected fixed-point rename buffer is allocated. The data stored within a selected one of fixed-point rename buffers 23 is thereafter copied to its associated GPR 22 in response to signals from sequencer unit 17. Sequencer unit 17 directs each copying of data stored at a selected one of fixed-point rename buffers 23 in response to "completing" the instruction that generated the data. This copying operation is called "writeback," which is not to be confused with similarly named cache operation. In the illustrative embodiment, data can be written back to two of GPRs 22 per clock cycle.

Similarly, when data is stored within a selected one of floating-point rename buffers 26, the data is associated with one of FPRs 25. Data stored within a selected one of floating-point rename buffers 26 is thereafter copied to its associated one of FPRs 25 in response to signals from sequencer unit 17. Sequencer unit 17 directs the copying of data stored at a selected one of floating-point rename buffers 26 in response to completion of the instruction that generated the data.

Processor 10 achieves high performance by processing multiple instructions simultaneously at various ones of execution units 11, 12, 13, 14, 15, and 16 utilizing a technique known as pipelining. Accordingly, each instruction is processed as a sequence of stages, each stage being executable in parallel with stages of other instructions. In a significant aspect of the illustrative embodiment, an instruction is normally processed as six stages, namely fetch, decode, dispatch, execute, completion, and writeback.

In the fetch stage, sequencer unit 17 selectively fetches, from one or more memory addresses within instruction cache 27, the sequence of instructions discussed further hereinabove in connection with branch unit 11 and sequencer unit 17. Up to four of the fetched instructions are then decoded by sequencer unit 17 during the decode stage.

In the dispatch stage, sequencer unit 17 selectively dispatches up to four decoded instructions to selected (in response to the decoding in the decode stage) ones of execution units 11, 12, 13, 14, 15, and 16 after reserving rename buffer entries for the dispatched instructions' results (destination operands). In the dispatch stage, operands are supplied to the selected execution units for dispatched instructions. Processor 10 dispatches instructions in program order.

In the execute stage, execution units 11–16 execute their dispatched instructions and output results (destination operands) of their operations for storage at selected entries in fixed-point rename buffers 23 and floating-point rename buffers 26 as discussed further hereinabove. In this manner, processor 10 is able to execute instructions out-of-order relative to their program order.

In the completion stage, sequencer unit 17 indicates that an instruction is complete. Processor 10 completes instructions in program order. In the writeback stage, sequencer unit 17 directs the copying of data from selected fixed-point rename buffers 23 and floating-point rename buffers 26 to GPRs 22 and FPRs 25, respectively. Likewise, in the writeback stage of a particular instruction, processor 10 updates its architected state in response to the particular instruction. Processor 10 processes the respective writeback stages of instructions in program order. Processor 10 advantageously merges an instruction's completion and writeback stages in specified situations.

In the illustrative embodiment, each instruction requires one machine cycle to complete each of the stages of instruction processing. Nevertheless, some instructions, such as complex fixed-point instructions, may require more than one cycle. Accordingly, a variable delay may occur between a particular instruction's execution and completion stages in response to the variation in time required for completion of preceding instructions.

Figure 2:
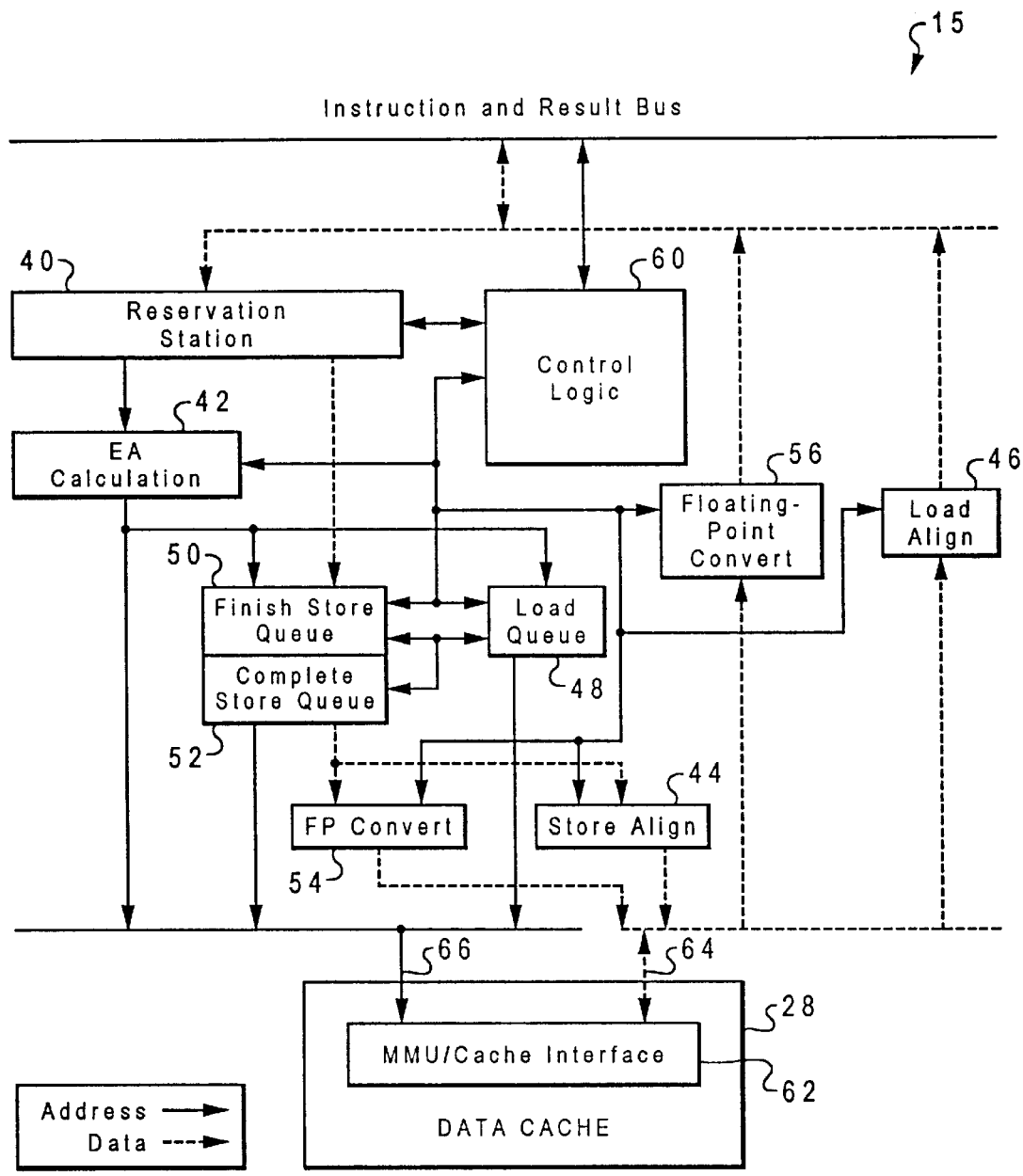
FIG. 2 is a more detailed block diagram depiction of the load/store execution unit (LSU) of the processor illustrated in FIG. 1.

Referring now to FIG. 2, there is illustrated a more detailed block diagram depiction of LSU 15 within processor 10. As depicted, the principal components of LSU 15 include reservation station 40, EA calculation unit 42, alignment units 44 and 46, load queue 48, a store queue comprising finish store queue 50 and complete store queue 52, and floating-point (FP) conversion units 54 and 56, which all operate under the control of control logic 60. In response to receipt of an instruction from sequencer unit 17, LSU 15 temporarily stores the instruction within reservation station 40 until all of the instruction operands become valid. Once all of the instruction operands of an instruction stored within reservation station 40 become valid, LSU 15 executes the instruction at an effective address (EA) calculation stage, which is the first of two pipeline stages. At the first pipeline stage, EA calculation unit 42 calculates the EA of the instruction from the instruction operands. In addition, the EA is passed to MMU/cache interface 62, which translates the EA into a physical address within system memory 20 and checks the EA for an exception.

Following processing at the first pipeline stage, control logic 60 causes an instruction to be stored within either finish store queue 50 or load queue 48, depending upon whether the instruction is a store or load instruction, respectively. Load queue 48 temporarily stores load instructions until the data word(s) specified by the instruction are all loaded into GPRs 22 or FPRs 25. Finish store queue 50 is utilized to temporarily hold uncompleted store instructions for which physical addresses have been calculated. In response to receipt of a signal from sequencer unit 17 that a store instruction within finish store queue 50 has been completed, the instruction is transferred to complete store queue 52. The completed store instruction is then held within complete store queue 52 until the data word(s) indicated by the store instruction can be written from GPRs 22 or FPRs 25 to data cache 28.

As depicted in FIG. 2, data written to data cache 28 in response to execution of a store instruction are selectively passed through FP conversion unit 54 or store alignment unit 44, which each selectively perform a data manipulation operation in response to receipt of control signals from control logic 60. For example, in response to receipt of a "store floating-point single" instruction, which specifies that a double-precision value is to stored in single-precision format, control logic 60 signals FP conversion unit 54 to normalize the double-precision value prior to transmitting it to data cache 28. As described below, in response to receipt of a store string instruction having a misaligned address, control logic 60 causes store alignment unit 44 to merge and shift the destination operand data bytes appropriately.

Similarly, data word(s) loaded from data cache 28 in response to execution of a load instruction are selectively passed through FP conversion unit 56 or load alignment unit 46, which each selectively perform a data manipulation operation in response to receipt of control signals from control logic 60. For example, in response to receipt of a load string instruction having a misaligned address, control logic 60 causes load alignment unit 46 to merge and shift the destination operand data bytes appropriately. Importantly, data bus 64 linking LSU 15 and data cache 28 is capable of transferring a doubleword of data during each cycle.

Figure 3:
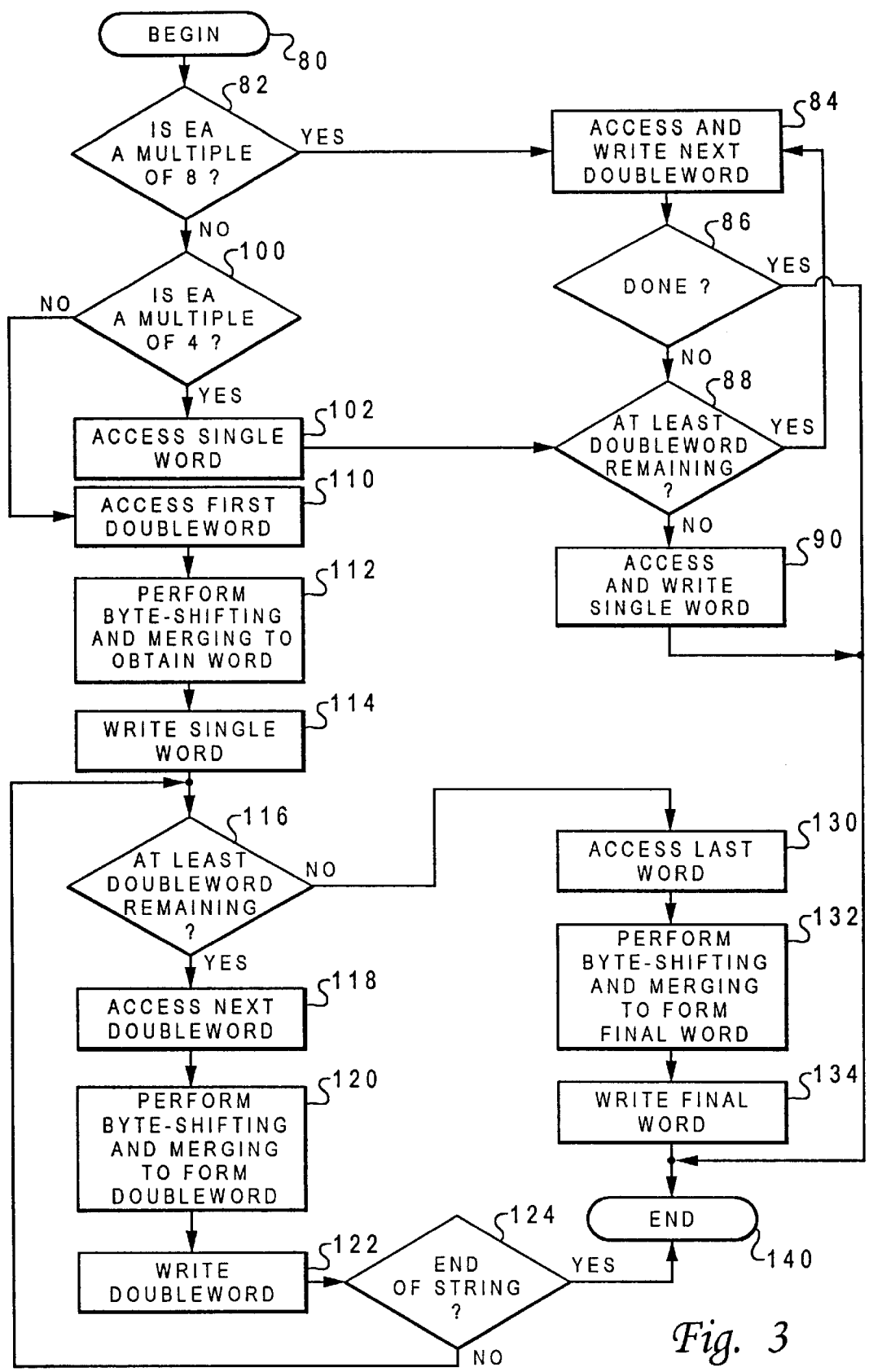
FIG. 3 is a flowchart illustrating the execution of a multiple-register instruction according to the illustrative embodiment.

With reference now to FIG. 3, there is illustrated a high level logical flowchart of the method by which processor 10 executes a multiple register instruction. As will become apparent from the following description, the process depicted in FIG. 3 is applicable to both load and store multiple instructions, which are either doubleword or word aligned, as well as load and store string instructions, which are unaligned. As illustrated, the process begins at block 80 and thereafter proceeds to block 82, which illustrates a determination by control logic 60 whether or not the EA calculated by EA calculation unit 42 is a multiple of 8 (i.e., whether or not the EA of the multiple-register instruction is doubleword aligned). In response to a determination at block 82 that the EA of the multiple-register instruction is doubleword aligned, the process proceeds to blocks 84–90, which depict LSU 15 performing the operation indicated by the multiple-register instruction.

Figure 4A:
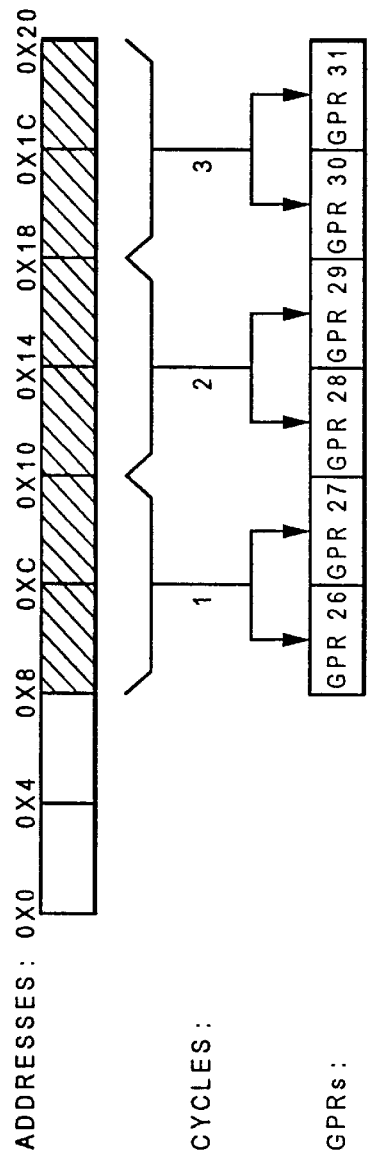
FIGS. 4A depicts the execution timing of multiple-register instructions for which the operands are doubleword aligned.

Referring now to FIG. 4A, a timing diagram of the execution of a multiple-register instruction having a doubleword aligned EA is depicted. As indicated, the instruction is a load multiple instruction having two operands. The first operand specifies GPR26 as the register into which the first data word of the transfer is to be loaded. By virtue of the fact that multiple-register instructions are architecturally defined as accesses to the highest numbered registers among GPRs 22, the first operand also indicates the number of data words to be transferred from data cache 28 to GPRs 22 (i.e., 32–26=6). The second operand of the load-multiple instruction depicted in FIG. 4A specifies the base address of the data block to be transferred.

Referring again to FIG. 3, blocks 84–90 will now be described with reference to FIG. 4A. Block 84 illustrates LSU 15 accessing the next doubleword of data from data cache 28, which for the exemplary load multiple instruction depicted in FIG. 4A, comprises the doubleword stored at address 0x8. The doubleword is then written into GPR26 and GPR27 in a single operation. In the illustrative embodiment, multiple register instructions are serialized within processor 10, thereby permitting fixed-point rename buffers 23 to be effectively bypassed in the absence of contention for GPRs 22. However, in an alternative embodiment in which all loaded data words are architecturally required to be loaded into fixed-point rename buffers 23, the data words can still be loaded into GPRs 22 without appreciable additional delay. As illustrated in FIG. 4A, barring a miss in data cache 28 or other latency-causing factor, the doubleword accessed at block 84 is stored within GPRs 22 in a single clock cycle.

Next, the process proceeds from block 84 to block 86, which illustrates a determination of whether or not all of the specified data words have been accessed. If so, the process passes to block 140 and terminates. However, in response to a determination at block 86 that additional data words remain to be accessed, the process proceeds from block 86 to block 88, which depicts a determination of whether or not at least one additional doubleword of data remains to be accessed. If so, the process returns to block 84, which has been described. Thus, in the example illustrated in FIG. 4A, blocks 84, 86, and 88 are performed two additional times in order to load three doublewords of data into GPRs 22 during three consecutive clock cycles. Referring again to block 88, in response to a determination that only a single data word remains to be accessed, the process proceeds to block 90, which illustrates an access of the single remaining data word. The process then passed to block 140 and terminates.

Referring again to block 82, in response to a determination that the EA of the multiple-register instruction is not a multiple of 8, thus indicating that the EA is word aligned or unaligned, the process passes to block 100. Block 100 illustrates a determination of whether or not the EA of the multiple-register instruction is a multiple of 4 (i.e., whether or not the EA of the multiple-register instruction is word aligned). If so, the process proceeds from block 100 to block 102, which illustrates an access of a single data word during a first clock cycle. The process then proceeds to block 88, which depicts a determination of whether or not at least one doubleword of data remains to be accessed. If so, the process passes to block 84, which has been described. However, in response to a determination that only a single data word remains to be accessed, the process passes to block 90, which has also been described. Thus, in accordance with the described illustrative embodiment, the access specified by a multiple-register instruction is performed, even in the worst case of a word aligned doubleword access, with the same or better performance than a sequence of single register instructions.

Figure 4B:
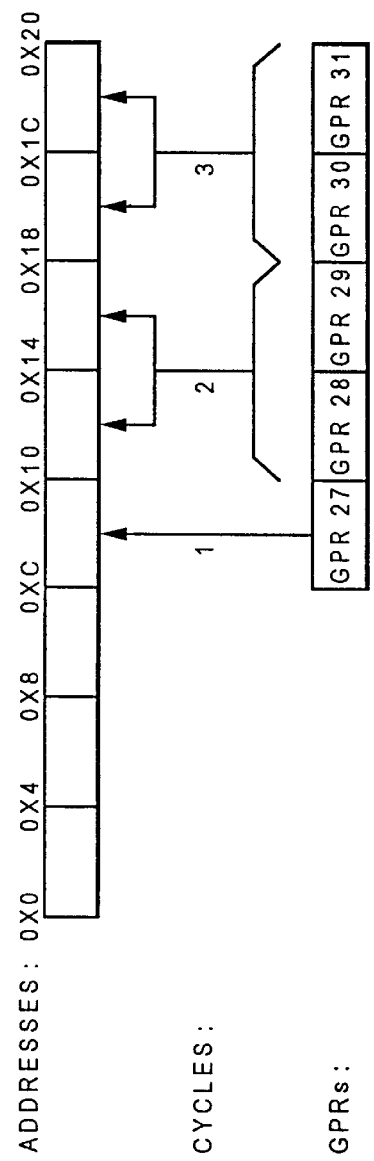
FIG. 4B illustrates the execution timing of multiple-register instructions for which the operands are word aligned.

With reference now to FIG. 4B, there is illustrated a timing diagram of a word aligned data transfer in accordance with the illustrative embodiment. As indicated, the exemplary store multiple instruction has a first operand that indicates the length of the data transfer and a second operand that indicates the base address of the data transfer. As illustrated in FIG. 4B and at block 102 of FIG. 3, only the first (word aligned) data word is accessed during the first cycle. During subsequent accesses, however, doublewords of data can be transferred from GPRs 22 to LSU 28 since these data words are doubleword aligned.

Returning to block 100 of FIG. 3, in response to a determination that the EA of the multiple-register instruction is not a multiple of 4, thereby indicating that the multiple-register instruction is load string or store string instruction having an unaligned EA, the process proceeds from block 100 to block 110. Block 110 depicts an access of the first doubleword of data from either GPRs 22 or LSU 28, depending upon whether the instruction is load string or store string instruction. The process proceeds from block 110 to block 112, which illustrates the appropriate one of store alignment unit 44 and load alignment unit 46 performing the necessary byte-shifting and merging to obtain a single data word. Next, the single data word is written to either GPRs 22 or LSU 28, again depending upon whether the instruction is a load string or store string instruction. Thus, for the exemplary load string instruction depicted in FIG. 4C, which loads an unaligned 7 data word string from data cache 28, blocks 110–114 of FIG. 3 represent LSU 15 loading the doubleword at address 0x0, byte-shifting the loaded doubleword within load alignment unit 46 to obtain the single data word at address 0x3, and writing the data word thus obtained into GPR25.

Figure 4C:
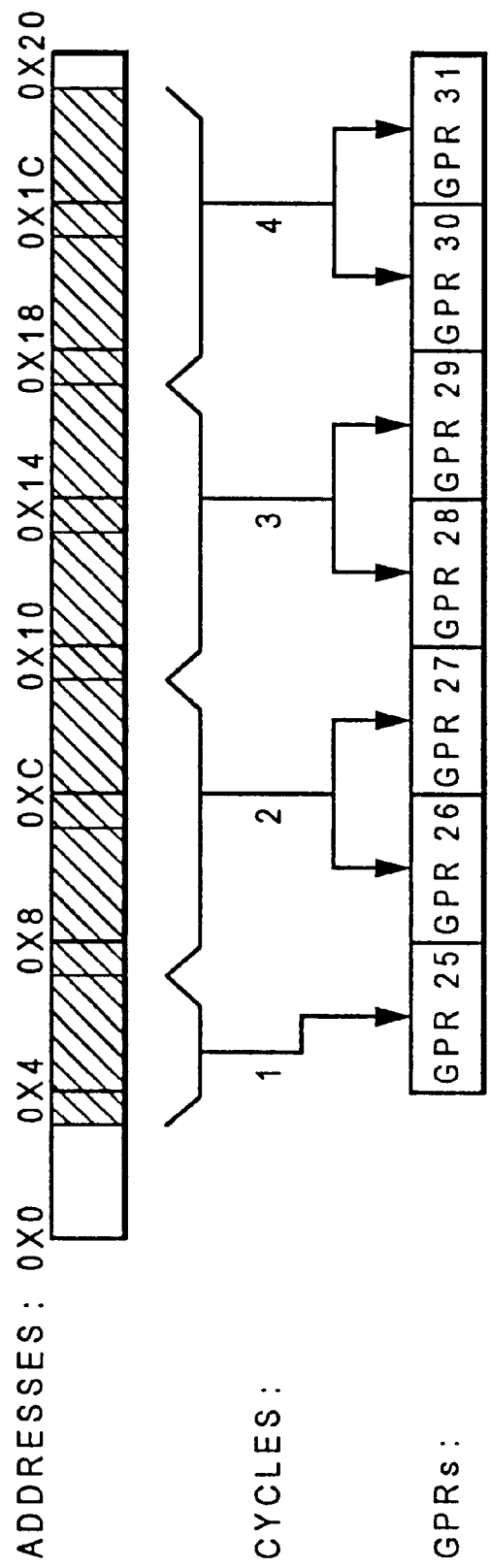
FIG. 4C depicts the execution timing of multiple-register instructions for which the operands are unaligned.

Referring again to FIG. 3, the process proceeds from block 114 to block 116, which depicts a determination of whether or not at least a doubleword of data remains to be accessed. If not, the process proceeds to block 130, which is described below. However, in response to a determination at block 116 that at least a doubleword of data remains to be accessed, the process passes to block 118, which illustrates an access of the next doubleword of data to be transferred. Referring again to the example shown in FIG. 4C, the step depicted at block 118 entails LSU 15 loading the doubleword at address 0x8. Returning to FIG. 3, the process passes from block 118 to block 120, which illustrates the appropriate one of alignment units 44 and 46 performing appropriate byte-shifting and merging to form a doubleword of data. Thus, for the example shown in FIG. 4C, load alignment unit 46 combines the data byte having address 0x7, which was retained by load alignment unit 46 from the previous access illustrated at block 110 of FIG. 3, with data bytes 0x8–0xE to form a doubleword of data. Then, as depicted at block 122 of FIG. 3, the doubleword is written to GPR26 and GPR27 in a single cycle (barring any other latency factors). The process proceeds from block 122 and 124, which depicts a determination of whether or not the end of the data string has been reached. If so, the process passes to block 140 and terminates. If, however, the end of the data string has not been reached, the process returns from block 124 to block 116, which illustrates a determination of whether or not at least a doubleword of data remains to be transferred. If so, the process repeats blocks 118–124, which have been described. As indicated in FIG. 4C, blocks 116–124 of FIG. 3 would be repeated two additional times in order to transfer doublewords 0x0F–0x16 and 0x17–0x1E in two additional cycles.

Returning to block 116 of FIG. 3, in response to a determination that only a single data word remains to be transferred, the process passes from block 116 to block 130. Block 130 illustrates an access of the last data word to be transferred. Next, the process passes to block 132, which illustrates the appropriate one of alignment units 44 and 46 byte-shifting and merging the last data word retrieved at block 130 to form a final data word, which is written at block 134. Thereafter, the process terminates at block 140.

As described above with respect to an illustrative embodiment, an improved method and system for executing a multiple-register instruction are provided. According to the described method and system, a processor can permit a single instruction to selectively write to and read from multiple registers during a single processor cycle, thereby greatly enhancing the speed at which data can be transferred to and from memory. While an illustrative embodiment has been particularly shown and described, it will be understood by those skilled in the art that various changes in form and detail may be made therein without departing from the spirit and scope of the illustrative embodiment.

What is claimed is:

1. A method of processing a multiple-register load string instruction within a processor including a set of data registers and having an associated memory, each of said data registers in said set being capable of storing a data word, said method comprising:

dispatching a multiple-register load string instruction for execution, wherein said multiple-register load string instruction specifies a plurality of data words that are to be written to a corresponding plurality of data registers within said set of data registers as a result of execution of said multiple-register load string instruction; and in response to dispatch of said multiple-register load string instruction, executing said multiple-register load string instruction, wherein as a result of said execution at least two data words among said plurality of data words are written from a plurality of contiguous locations within said memory to at least two corresponding data registers among said plurality of data registers during a single cycle of said processor, wherein a first location among said plurality of contiguous locations has an unaligned address that is not aligned with a data word boundary.

2. The method of claim 1, wherein said step of executing said multiple-register instruction comprises the steps of:

retrieving contents of at least two contiguous locations in said memory during a first cycle of said processor;

retrieving contents of at least two other contiguous locations in said memory during a second cycle of said processor; and merging said contents retrieved during said first cycle with said contents retrieved during said second cycle to form said at least two data words to be written to said at least two corresponding data registers.

3. A method of processing a multiple-register store string instruction within a processor, wherein said processor has a memory associated therewith and includes a set of data registers, each of said data registers in said set being capable of storing a data word, said method comprising:

dispatching a multiple-register store string instruction specifying a plurality of data words that are to be written from a plurality of data registers within said set of data registers to a corresponding plurality of locations in said memory as a result of execution of said multiple-register store string instruction; and in response to dispatch of said multiple-register store string instruction, executing said multiple-register store string instruction, wherein as a result of said execution at least two of said plurality of data words are written from said plurality of data registers to at least two corresponding sequential locations in said memory during a single cycle of said processor, wherein a first location among said at least two corresponding sequential locations has an unaligned address that is not aligned with a data word boundary.

4. The method of claim 3, wherein said step of executing said multiple-register instruction comprises the steps of:

retrieving contents of at least two data registers within said set of data registers during a first cycle of said processor;

retrieving contents of at least two other data registers within said set of data registers during a second cycle of said processor; and merging said contents retrieved during said first cycle with said contents retrieved during said second cycle to form said at least two data words to be written to said at least two corresponding locations in said memory.

5. A processor having an associated memory, said processor comprising:

a set of data registers, each of said data registers in said set being capable of storing a data word; and execution circuitry, wherein in response to receipt of a multiple-register load string instruction specifying a plurality of data words that are to be written from the memory to a corresponding plurality of data registers within said set of data registers as a result of execution of said multiple-register load string instruction, said execution circuitry writes at least two data words among said plurality of data words from contiguous locations within said memory to at least two corresponding data registers among said plurality of data registers during a single cycle of said processor, said execution circuitry including access circuitry that retrieves said at least two data words from said contiguous locations within said memory, wherein a first location among said contiguous locations within said memory has an unaligned address that is not aligned with a data word boundary.

6. The processor of claim 5, wherein said access circuitry retrieves contents of at least two contiguous locations in said memory during a first cycle of said processor and contents of at least two other contiguous locations in said memory during a second cycle of said processor, said execution circuitry further comprising:

merging circuitry, wherein said merging circuitry merges said contents retrieved during said first cycle with said contents retrieved during said second cycle to form said at least two data words to be written to said at least two corresponding data registers.

7. A processor having a memory associated therewith, said processor comprising:

a set of data registers, each of said data registers in said set being capable of storing a data word; and execution circuitry, wherein in response to receipt of a multiple-register store string instruction specifying a plurality of data words that are to be written from a plurality of data registers within said set of data registers to a corresponding plurality of locations in said memory as a result of execution of said multiple-register store string instruction, said execution circuitry writes at least two of said plurality of data words from said plurality of data registers to at least two corresponding sequential locations in said memory during a single cycle of said processor, wherein a first location among said plurality of sequential locations has an unaligned address that is not aligned with a data word boundary.

8. The processor of claim 7, wherein said access circuitry retrieves contents of at least two data registers within said set of data registers during a first cycle of said processor and contents of at least two other data registers within said set of data registers during a second cycle of said processor, said processor further comprising:

merging circuitry, wherein said merging circuitry merges said contents retrieved during said first cycle with said contents retrieved during said second cycle to form said at least two data words to be written to said at least two corresponding locations in said memory.

* * * * *